No. 833,864. PATENTED OCT. 23, 1906.
W. J. BARRON & H. W. MERRITT.
TYPE WRITING MACHINE.
APPLICATION FILED FEB. 6, 1902.

WITNESSES:
K. V. Donovan
Charles E. Smith

INVENTORS
Walter J. Barron & Henry W. Merritt
by Jacob Felbel
THEIR ATTORNEY

No. 833,864. PATENTED OCT. 23, 1906.
W. J. BARRON & H. W. MERRITT.
TYPE WRITING MACHINE.
APPLICATION FILED FEB. 6, 1902.

WITNESSES
INVENTORS
THEIR ATTORNEY

No. 833,864. PATENTED OCT. 23, 1906.
W. J. BARRON & H. W. MERRITT.
TYPE WRITING MACHINE.
APPLICATION FILED FEB. 6, 1902.

WITNESSES.
K. V. Donovan.
Charles E. Smith.

INVENTORS
Walter J. Barron & Henry W. Merritt
by Jacob Felbel
THEIR ATTORNEY

No. 833,864. PATENTED OCT. 23, 1906.
W. J. BARRON & H. W. MERRITT.
TYPE WRITING MACHINE.
APPLICATION FILED FEB. 6, 1902.

WITNESSES.
INVENTORS
THEIR ATTORNEY

No. 833,864. PATENTED OCT. 23, 1906.
W. J. BARRON & H. W. MERRITT.
TYPE WRITING MACHINE.
APPLICATION FILED FEB. 6, 1902.

WITNESSES:

INVENTORS
Walter J. Barron & Henry W. Merritt
By Jacob Felbel
THEIR ATTORNEY No. 833,864. PATENTED OCT. 23, 1906.
W. J. BARRON & H. W. MERRITT.
TYPE WRITING MACHINE.
APPLICATION FILED FEB. 6, 1902.

WITNESSES

INVENTORS
Walter J Barron + Henry W. Merritt
by Jacob Felbel
THEIR ATTORNEY No. 833,864. PATENTED OCT. 23, 1906.
W. J. BARRON & H. W. MERRITT.
TYPE WRITING MACHINE.
APPLICATION FILED FEB. 6, 1902.

WITNESSES
INVENTORS
THEIR ATTORNEY

UNITED STATES PATENT OFFICE.

WALTER J. BARRON, OF BROOKLYN, NEW YORK, AND HENRY W. MERRITT, OF SPRINGFIELD, MASSACHUSETTS, ASSIGNORS TO DENSMORE TYPEWRITER COMPANY, OF SYRACUSE, NEW YORK, A CORPORATION OF NEW YORK.

TYPE-WRITING MACHINE.

No. 833,864.     Specification of Letters Patent.     Patented Oct. 23, 1906.

Application filed February 6, 1902. Serial No. 92,840.

*To all whom it may concern:*

Be it known that we, WALTER J. BARRON, a resident of the borough of Brooklyn, county of Kings, city of New York, and State of New York, and HENRY W. MERRITT, a resident of Springfield, county of Hampden, and State of Massachusetts, citizens of the United States, have invented certain new and useful Improvements in Type-Writing Machines, of which the following is a specification.

Our invention relates to type-writing machines, and is particularly directed to the ribbon-feed mechanism and to various instrumentalities which coöperate with the ribbon.

The object of the invention may be briefly said to be to provide efficient mechanism to automatically reverse the direction of feed of the ribbon when an end thereof is reached; to bring about a reversal in the direction of the feed of the ribbon at any time by the employment of hand-operated mechanism; to provide means to automatically feed the ribbon laterally as well as longitudinally in order to use the entire ribbon from edge to edge thereof; to provide means for throwing the ribbon-feed mechanism out of operation at will, and to provide mechanism for efficiently guiding and protecting the ribbon.

To the above ends and others which will hereinafter appear, our invention consists in the novel arrangements and construction and combinations of parts to be hereinafter described, and particularly pointed out in the claims.

In the accompanying drawings, wherein like parts are designated by like reference characters in the various views.

In various views parts are omitted and broken away better to illustrate other features of the construction.

We have illustrated our invention in its application to a Densmore type-writing machine, although the drawings do not correctly represent in detail certain features of said machine. Thus, for instance, the carriage shown is not that of a Densmore machine, but is a conventional carriage which will suffice to illustrate our invention.

Figure 1:
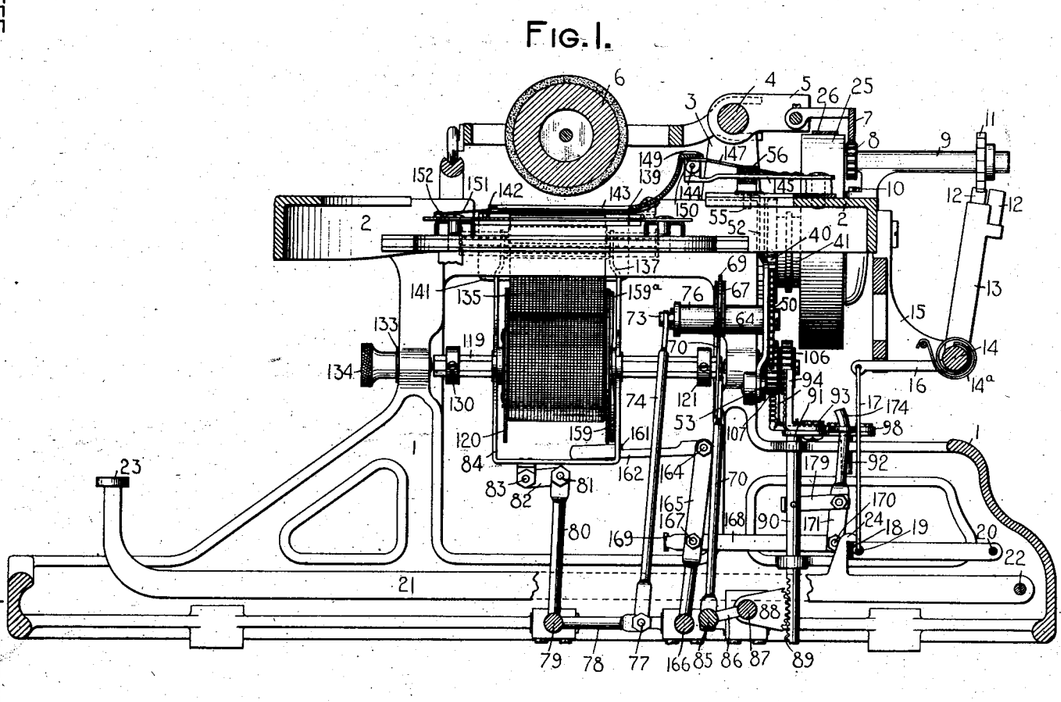
Figure 1 is a vertical sectional view of one form of type-writing machine embodying our invention, the section being taken from front to rear of the machine.
Figure 24:
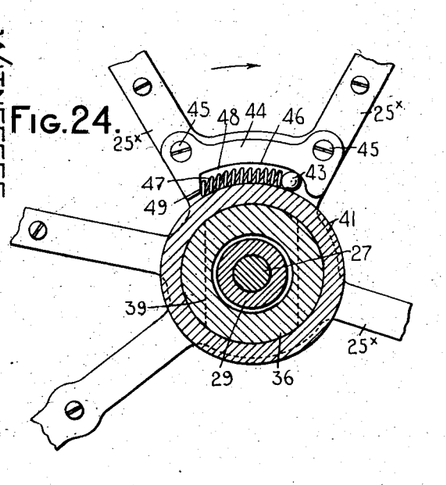
Fig. 24 is a fragmentary vertical sectional view of a portion of the carriage-drum and its clutch mechanism.
Figure 25:
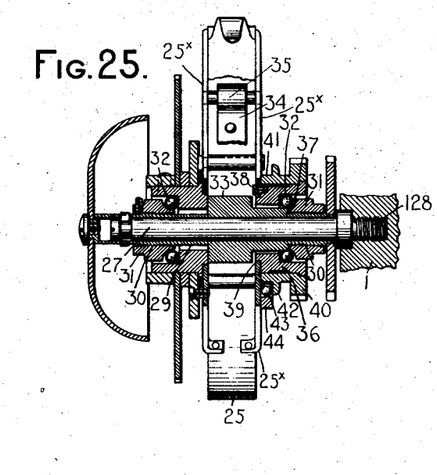
Fig. 25 is a transverse detail vertical sectional view of the spring-drum ribbon-feed alarm and line-lock mechanism, the view being taken at right angles to the view shown in Fig. 24.

Referring particularly to Fig. 1 of the drawings, 1 indicates the framing of the machine, to which the usual top plate 2 may be secured, and it will be understood that the usual or any preferred type-carriers may be employed. Supporting studs or lugs 3 are secured to the top plate 2 and have secured thereto a traverse rod 4, on which the carriage 5 travels from end to end of the machine. This carriage 5 has operatively connected thereto a platen 6, and a feed-rack 7 may be carried by the carriage 5 in any suitable manner to coöperate with a feed-pinion 8, which is secured to one end of a shaft adapted to rotate a bearing 9, secured to the top plate of the machine at 10. The opposite end of this shaft may be operatively connected to a feed-wheel 11, which in turn coöperates with the feed-dogs 12, that are carried by a dog-carrier 13, connected to a rock-shaft 14, that is adapted to rock in suitable bearings 15, secured to the frame of the machine, and is returned to its normal position by a spring 14ª. This rock-shaft 14 likewise has projecting therefrom a crank-arm 16, to which a link 17 may be secured, and the lower end of this link 17 is connected at 19 to a universal bar 18, which may be in the form of a yoke the free ends of which are pivoted to the framing of the machine at 20. Each of the key-levers 21 is pivoted in the framing of the machine at 22 and is provided with the usual finger-key 23 and with an abutment or hook 24, that is adapted to bear upon the upper edge of the universal bar 18, so that when a key 23 is depressed its key-lever will transmit a rocking motion to the dog-carrier through the universal bar and the intermediate connections between the dog-carrier and the universal bar. When the dog-carrier 13 is rocked in the manner described, a feed movement of the carriage will be brought about through the revolving spring-drum 25, which is adapted to revolve upon suitable bearings secured to the framing of the machine and which is operatively connected to the carriage by a band 26, which is secured at one end to said spring-drum and at its opposite end to the carriage. The spring-drum 25 and its connections and the manner of mounting the same are shown in detail in Figs. 24 and 25 of the drawings, from which it will be seen that a spindle 27 is provided with a screw-threaded end 28, which takes in a threaded opening in the framing 1 of the machine. This spindle 27 is adapted to receive a sleeve 29, which extends substantially throughout the length thereof and is screw-threaded at its ends 30 for the reception of separate bearings 31 for the antifriction-balls 32. The central enlarged portion 33 of this sleeve 29 is adapted to be secured to the inner end of a carriage-spring 34, the outer end of said spring being connected to the drum at 35. A bearing-sleeve 36 surrounds the sleeve 29, and the associated bearing 31 is provided with an internal raceway or bearing-surface 37, which coöperates with the sleeve 36 to receive the antifriction-balls 32 between them. This bearing-sleeve is rigidly connected to the spider-arm 25ˣ of the drum by one or more screws 38, which extend through the spider-arms and into the body of the sleeve, and the central bearing of the spider-arms 25ˣ is apertured at 39 to receive an extended portion of the sleeve 36. The shape of the aperture 39 is indicated in dotted lines in Fig. 24, and the extended portion of the sleeve which fits therein is made of a corresponding contour in order to lock the sleeve and drum to rotate together, while the screw or screws 38, hereinbefore referred to, prevent a lateral displacement of the sleeve with relation to the drum. Surrounding the sleeve 36 and prevented from lateral displacement thereon is a main driving gear-wheel 40 for the ribbon-feed mechanism, which gear has a circumferential bearing-surface 41 formed integral therewith and from which projects a circumferential flange 42. A friction clutch-roller or locking-ball 43 is adapted to bear upon the surface 41 and is contained within a housing 44, which is secured at 45 to the spider-arms 25ˣ. The inner wall 46 of this housing is inclined and adapted to wedge the ball 43 against the bearing-surface 41 when the parts are in the position represented in Fig. 24 of the drawings, and a spring 47 is employed to prevent the ball 43 from free movement in the recess 48 in the housing during the rotation of the drum, the spring bearing at one end against a wall 49 of the housing and at its opposite end against the ball itself. From the foregoing description it will be understood that when the carriage is moved upon its traverse-rod 4 from left to right the drum 25 will be rotated in the direction of the arrow in Fig. 24, and that this movement of the drum will cause the roller 43 of the clutch device to be forced against the tension of its spring to permit the drum to rotate independently of the bearing-surface 41 and the gear-wheel 40, which is formed integral therewith. When, however, the carriage is moved in the direction of its feed, or from right to left, the drum 25 will be rotated in a direction opposite to that indicated by the arrow in Fig. 24, and the locking ball or roller 43 will be forced into a wedging engagement with the surface 41, thereby causing said surface and the gear-wheel 40 to rotate with the drum. From this it follows that when the carriage is moved from left to right no movement will be transmitted to the gear-wheel 40, but when the carriage is moved from right to left, or in the direction of its feed, a movement will be transmitted to the gear-wheel through the intermediate clutch arrangement between the drum 25 and the gear.

Figure 6:
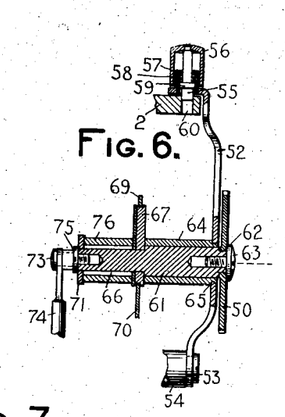
Fig. 6 is a detail transverse sectional view of a portion of the ribbon-feeding mechanism to be hereinafter more fully described.
Figures 7, 8, 9:
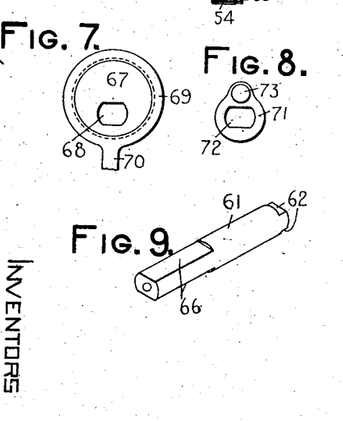
Fig. 7 is a detail face view of a portion of the same.
Fig. 8 is a detail face view of the crank-pin-carrying plate of the ribbon-feeding mechanism.
Fig. 9 is a detail perspective view of the shaft for the driven wheel crank-pin-carrying plate and eccentric of the ribbon-feeding mechanism.
Figure 10:
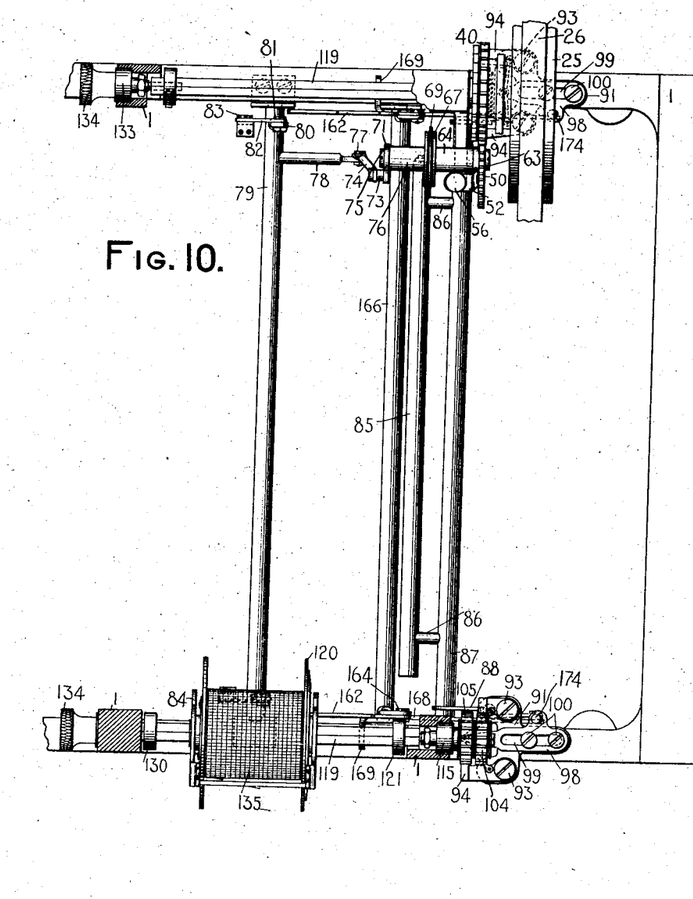
Fig. 10 is a detail plan view of the ribbon-feeding mechanism.

The gear-wheel 40 we term a "driving-gear," and this gear meshes with a driven gear 50, which rotates on a center 51, Fig. 6, on an arm 52, that is pivoted at 53 to swing on a bracket 54, that is secured to the framing of the machine. The upper end of this arm 52 is bent at right angles to the length thereof and is perforated for the passage of a locking-bolt 55, the upper end of said locking-bolt being connected to a finger-piece or hollow head 56 to move the bolt against the tension of its spring 57. This spring 57 is contained within and bears at one end upon a housing 58, that is secured to the upper end of the arm 52, whereas the opposite end of the spring bears upon a circumferential shoulder 59, carried by the bolt, so as to depress the bolt and normally maintain it in locking engagement with any one of the apertures 60 in the top plate 2 of the machine. From an examination of Fig. 2 of the drawings it will be understood that when the finger-piece 56 is raised, so as to disengage the bolt 55 from locking engagement with an aperture 60 in the top plate, and the arm 52 is swung around its pivotal center 53, to the left in said figure, a disengagement between the driving-gear 40 and the driven gear 50 will be effected, and motion cannot be transmitted from the driving to the driven gear. When the arm 52 has been moved in the manner stated, the locking-bolt 55 will be brought opposite another aperture 60, and the spring 57 will force the bolt into engagement in said aperture, so as to maintain the arm 52 in the disengaged position, with the gear-wheels 40 and 50 out of mesh. By referring to Figs. 6, 7, 8, and 9 of the drawings it will be seen that the pivotal center 51 of the driven gear 50 is formed by a shaft 61, which has one end flattened at 62 for coöperation with a corresponding opening in the gear-wheel 50, so that the gear-wheel and shaft will rotate together, the gear-wheel being maintained in place upon the shaft by a headed screw 63. This shaft 61 rotates within a bearing-sleeve 64, that projects from and is secured to the arm 52, as shown at 65. The opposite end of the shaft 61 is flattened on the sides thereof at 66 for the reception of an eccentric 67, which has an opening 68, that corresponds in contour to the cross-section of the shaft 61 at that portion thereof which receives said eccentric, so that the shaft and eccentric rotate together, and surrounding the eccentric 67 is a strap 69, which is provided with a depending arm 70 for purposes which will hereinafter appear.

The forward terminal of the shaft 61 is adapted to receive a plate 71, the aperture 72 in which corresponds in contour to the cross-section of the shaft at that portion thereof which receives the plate, so that the shaft and plate rotate together, and the plate 71 is provided with a crank 73, to which a depending link 74 is pivotally connected. The plate 71 may be maintained upon the shaft by a headed screw 75, which is received in a screw-threaded opening in the shaft, and a spacing-sleeve 76 surrounds the shaft and is interposed between the eccentric 67 and the plate, so as to maintain the plate 71 and eccentric against lateral displacement.

Figure 2:
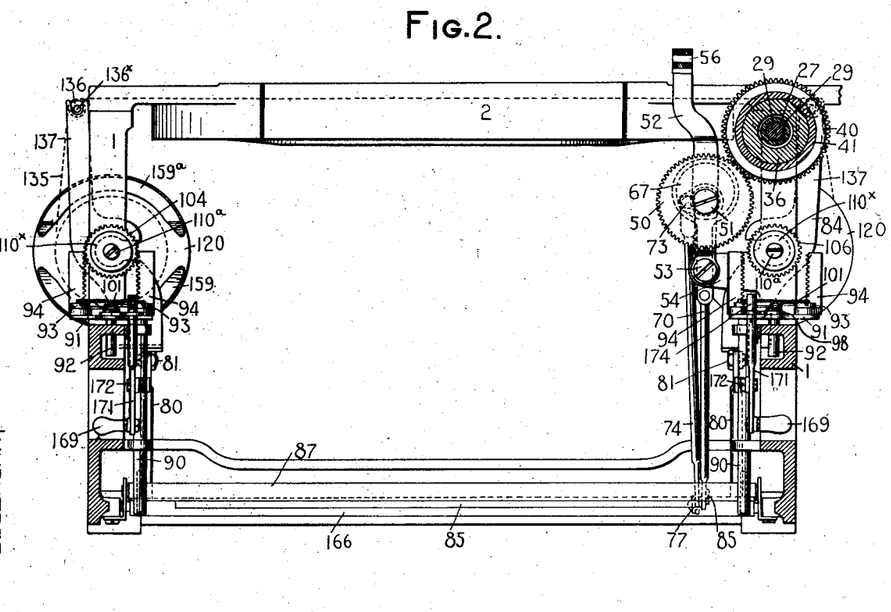
Fig. 2 is a vertical sectional view of the machine, the section being taken from side to side of the machine and looking toward the rear.

Upon reference to Figs. 1, 2, 6, 11, and 12 it will be seen that as the carriage moves in the direction of its feed the driving-gear 40 will be rotated, and motion will be imparted to the driven gear 50 if the two gears are maintained in mesh—in other words, if the lever 52 is secured in the position represented in Fig. 2 of the drawings. The motion thus transmitted to the driven gear 50 will be imparted to the shaft 61 (see Fig. 6) and from said shaft to the crank-pin 73, and the rotation of the crank-pin will cause a reciprocating movement to be imparted to the depending link 74, which is pivoted at its lower end 77 to a crank-arm 78, that projects from a rock-shaft 79, which extends from one side of the machine to the other. This rock-shaft 79 is likewise provided with upwardly-extending crank-arms 80, one of said arms being located at each side of the machine and each having its upper end pivoted at 81 to a link 82, the opposite end of which link is pivoted at 83 to a ribbon-spool yoke or frame 84, which is movable back and forth upon its support. It will thus be seen that as the carriage is intermittently moved in the direction of its feed an intermittent lateral feed movement will be imparted to the frames 84 of the ribbon-spools to move the ribbon laterally or in the direction of its width. We will suppose that a movement of the carriage from the right-hand side to the left-hand side will impart a half-revolution to the shaft 61, which will cause a lateral movement of the ribbon-spool frames from the extreme limit of movement in one direction to the extreme limit of movement in the opposite direction, and the other half-revolution of the shaft 61 will then cause the ribbon-spools to be moved back again to the initial position. It will be understood that the connection for each ribbon-spool frame between the frame and the rock-shaft 79 is the same, so that any movement transmitted to the rock-shaft will be imparted to both ribbon-spool frames.

Figure 16:
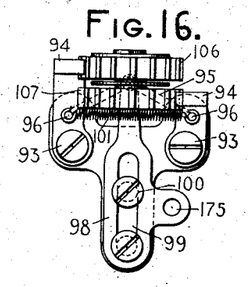
Fig. 16 is a detail plan view of a portion of the actuating mechanism for one of the ribbon-spools, the parts being shown in the operative position.

The rotation of the shaft 61 by a feed movement of the carriage will likewise cause the eccentric 67 to be rotated, thereby imparting a reciprocating movement to the depending arm 70 thereof. From an examination of Fig. 1 of the drawings it will be seen that the lower end of this depending arm 70 is pivoted to a transversely-extending shaft or bar 85, which is connected to arms 86, which extend from a rock-shaft 87, that is pivoted in the framing of the machine and extends from side to side thereof. This rock-shaft 87 has secured thereto at each side of the machine a segmental rack 88, the teeth of each of which engage in the teeth of a coöperating rack 89, that are formed in each of the vertically-movable bars 90, each of which bars constitutes a part of a feed-rack carrier 91, one of these feed-rack carriers 91 being located at each side of the machine, and each of them is provided with a depending guide-rod 92, which projects through an opening in the framing of the machine to guide the carrier in its vertical movement. To each side of each of these carriers is pivoted at 93 a feed-rack 94, that is vertically disposed and is adapted to swing around its pivot 93 from the position illustrated in Figs. 16 and 19 of the drawings to that indicated in Figs. 17 and 18. Each pair of feed-racks carried by a carrier is united by toggle-links 95, which are pivoted at 96 to the racks and are pivoted at their inner ends at 97 to a slide 98. Each slide 98 is provided with an elongated slot 99, through which headed screws 100, which are fixed to the carrier, project to guide the slide and limit it in its movement. From a comparison of Figs. 16 and 17 with Figs. 18 and 19 it will be seen that the toggle-links 95, which unite the racks on one carrier, move rearwardly when the racks are in engagement, whereas the links on the other carrier are moved forwardly when the racks are in engagement. In addition to the toggle-link connections between the racks they may be united by contractile springs 101, each of which is connected at its ends to the pivot-pins 96 to insure the engagement of the racks with their coöperating gear-wheels 104, 105, 106, and 107. The gears 104 and 105 are those employed, together with their racks, for coöperation with the right-hand ribbon-spool, whereas the gears 106 and 107, together with their racks, are those employed for coöperation with the left-hand ribbon-spool, as will now be described.

Figure 13:
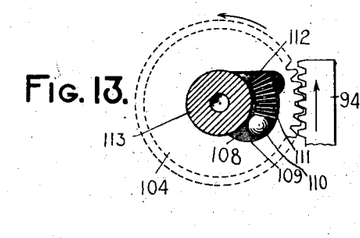
Figs. 13 and 14 are detail face views of the gears for transmitting rotary movement to one of the ribbon-spools, together with their clutch mechanism.
Figure 14:
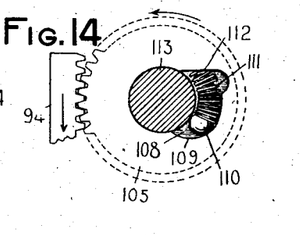
Figure 20:
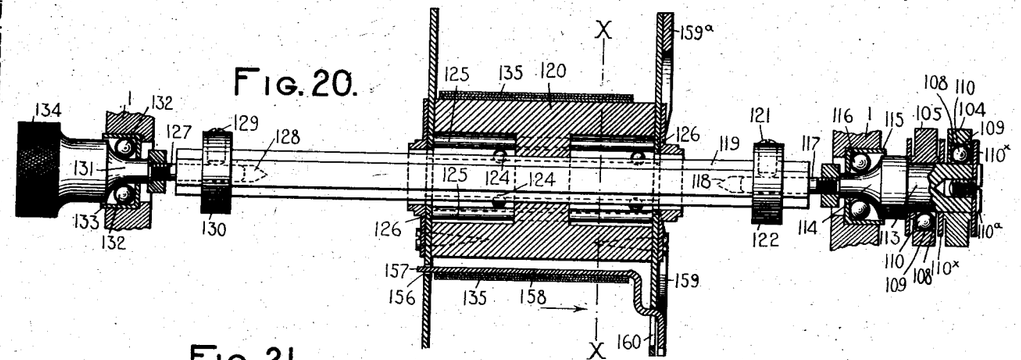
Fig. 20 is an enlarged detail longitudinal sectional view of one of the ribbon-spools and the means for supporting the same, together with a portion of the operating mechanism therefor.

Upon reference to Figs. 13, 14, and 20 of the drawings it will be observed that each of the gear-wheels 104 and 105, 106 and 107 are recessed at 108 and that one wall 109 of the recess is an inclined wall which constitutes a wedge against which a locking-roller or ball 110 is adapted to bear. Each ball is normally maintained in the position indicated in Figs. 13 and 14 by a spring 111, which bears at one end against a wall 112 of the recess and at the other end against the ball or wedging-roller, and the plates 110$^\times$ prevent the balls from escaping from their recesses. The outermost plates 110$^\times$ may each be secured in place by a screw 110$^a$. The gear-wheels 104 and 105 rotate upon a cylindrical bearing 113, against which the balls 110 are adapted to bear, and the gear-wheels 106 and 107 rotate around a corresponding bearing 113 and against which the balls 110 likewise bear. It will be understood that when any one of the gears is rotated in one direction or in the direction of the arrows in Figs. 13 and 14 the inclined wall 109 of the recess will cause a binding engagement between the ball 110 thereof and the cylindrical bearing for the gear, thus causing the gear and its bearing to rotate together. When, however, the gear is rotated in an opposite direction, and so as to force the ball from its wedging position and against the tension of its spring 111, the ball will be freed from locking engagement, thus permitting the gear to rotate independently of its cylindrical bearing 113. There are two gears mounted upon each cylindrical bearing, and these gears are adapted to be locked by their frictional clutch arrangement to cause the cylindrical bearing to rotate therewith when the gears are moved in one direction—that is to say, the gear 104, (see Fig. 13,) for instance, will be locked to rotate with its bearing when the gear is rotated in one direction by an upward movement of its rack 94, and said gear will be free to rotate in the opposite direction or when the rack is descending independently of the cylindrical bearing. On the other hand, the gear 105, (see Fig. 14,) which is on the same bearing, will be locked to the cylindrical bearing to cause said bearing to rotate with it when the coöperating rack 94 is moved down, whereas the gear will move independently of the bearing when the rack is moved up. From this it will be seen that a bearing is being rotated upon both the up and down movement of the racks, though the clutches on opposite sides of the machine engage to rotate their bearings in opposite directions.

Figure 21:
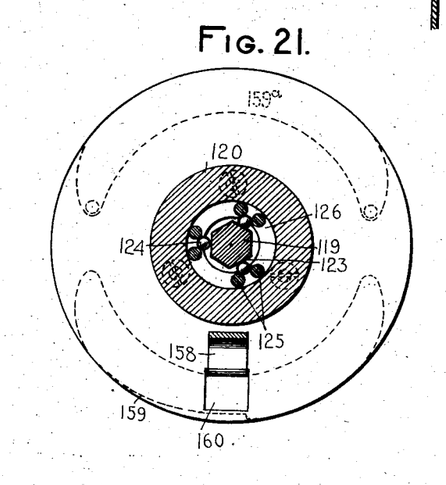
Fig. 21 is a transverse sectional view of the same, taken on the line X X of Fig. 20 and looking in the direction of the arrow in said figure.

Each cylindrical bearing 113 is provided with a roller-bearing extension 114, (see Fig. 20,) which extends into the open mouth of a cup-bearing 115, that is seated in a recess in the frame 1 of the machine, and antifriction balls or rollers 116 are interposed between the bearings 114 and 115. The bearing 114 is extended at 117, and the extended portion is adapted to be received within an opening 118 in the shaft 119 of the ribbon-spool 120. The shaft 119 may be secured to rotate with the extension by a set-screw 121, which projects through a collar 122 and through the shaft 119 and bears at its inner end upon said extension 117, so as to cause the parts to rotate together. The shaft 119 is angular in cross-section, preferably hexagonal, as indicated in Fig. 21 of the drawings, so as to provide flat bearing-surfaces 123 for the antifriction balls or rollers 124. These balls 124 are adapted to be received in ways formed within the ribbon-spool, which are preferably formed by longitudinally-extending rods 125, that are spaced apart so as to form bearing-roller spaces between them for the reception of the balls which are loosely disposed in their bearings and are prevented from escaping from the ways in the ribbon-spool by end-plate flanges 126 of said spool. It will be understood that with this construction a ball-bearing support is provided for each ribbon-spool in its movement upon the shaft 119 and that the disposition of the parts is such that the ribbon-spool is rotated with the shaft. The forward end of the shaft 119 is connected to a spindle 127, which extends into an opening 128 in the shaft and is secured thereto by a set-screw 129, that projects through a collar 130 and through the shaft 119 and bears at its inner end upon the spindle 127 to unite the spindle to the shaft. Connected to this spindle 127 is a bearing 131, against which the antifriction-balls 132 are adapted to bear, said balls being contained within a cup-bearing 133, which is seated in an aperture in the framing 1 of the machine. The bearing 131 is extended forward to form a knurled head 134, by means of which the shaft 119 and the ribbon-spool thereon may be rotated, and this rotation of the shaft may be effected without interference by the coöperating clutch connection between the gear-wheels 104 105 or 106 and 107 and their coöperating cylindrical bearings. The foregoing descriptions of the means for supporting and transmitting movement to one ribbon-spool applies to both ribbon-spools, it being understood that the construction and operation of the ribbon-spools at both sides of the machine is essentially the same, except that, as before explained, the clutches are engageable in opposite directions upon opposite sides of the machine to feed the ribbon longitudinally in opposite directions.

Figure 3:
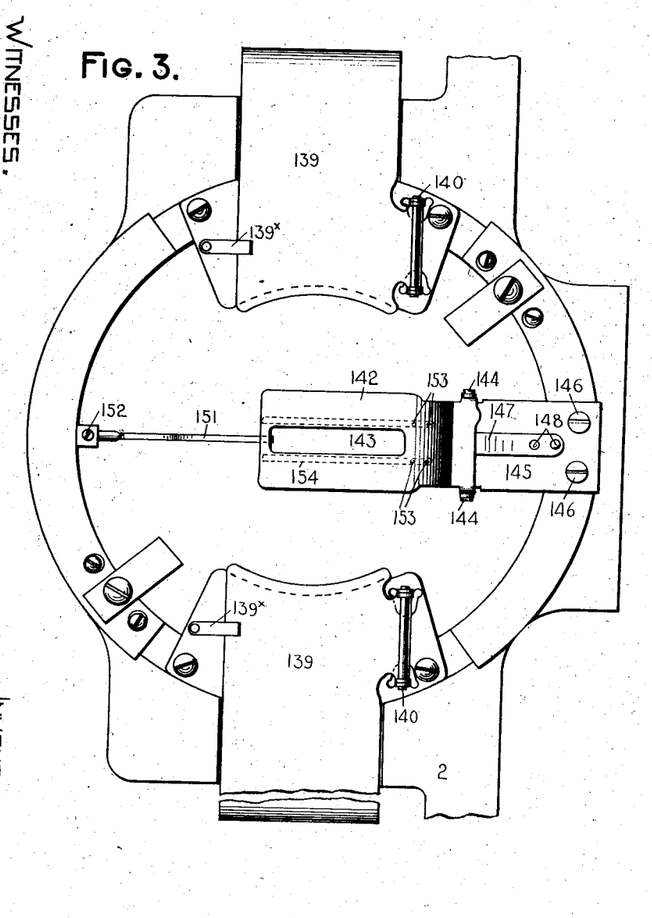
Fig. 3 is a detail plan view of the top plate and some of the parts secured thereto.
Figure 4:
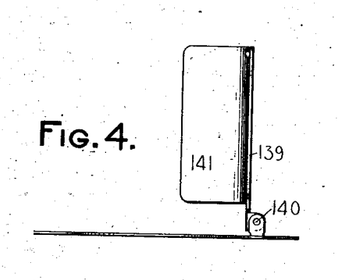
Fig. 4 is a detail end view of one of the ribbon-protecting plates, the view showing the plate in the elevated position.
Figure 15:
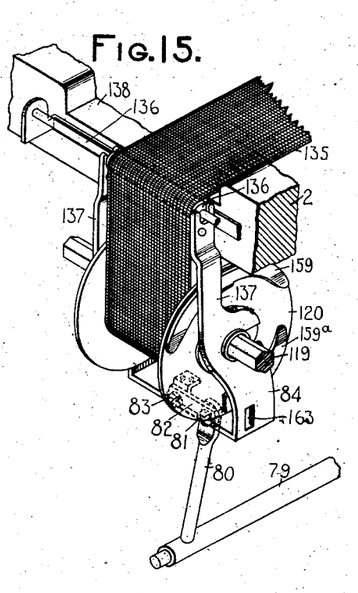
Fig. 15 is a detail perspective view of one of the ribbon-spools and a portion of its operating mechanism.

The ribbon 135 as it passes from one ribbon-spool to another extends over rollers 136, (see Figs. 2, 11, and 15,) carried between upwardly-extending arms 137, that project from each of the ribbon-frames 84, and these rollers 136 will move along fixed supporting-rods 136× when the frames are moved in the manner to be hereinafter described to feed the ribbon laterally or in the direction of its width. After the ribbon passes over the rollers 136, which are maintained adjacent to the side edges of the top plate 2 of the machine, as represented in Fig. 15 of the drawings, it extends into a depression 138 in the top plate and is covered by protecting-plates 139. (See Figs. 3 and 4.) There are two of these protecting-plates 139—one pivoted to each side of the type well or basket—and the hinges 140 thereof are parallel with one edge of the ribbon, so that the plates may be swung back independently of the ribbon to permit a removal thereof or to give access to the type-well. Each of these protecting-plates is provided with a depending guard 141, which covers and protects the ribbon at one side of the machine where it passes around the side edge of the top plate. This guard is clearly illustrated in Fig. 4 of the drawings, where the protecting-plate is shown in the elevated position, and a pivotal latch 139× may be employed to coöperate with each protecting-plate to lock it in the operative position.

Figure 5:
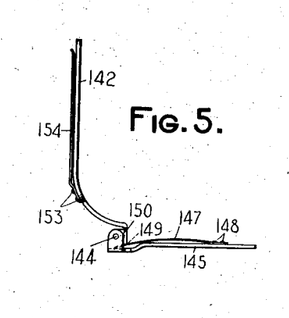
Fig. 5 is a detail side view of the ribbon-guide, the view illustrating the guide in the elevated position.

As the ribbon passes from side to side of the machine it extends beneath a guide-plate 142, which is apertured at 143 for the passage of the type on the type-bars in the movement thereof to the printing-point. This guide-plate is hinged at 144 to a fixed bracket 145, secured to the top plate at 146, and the hinge or pivotal axis of this guide-plate is parallel to an edge of the ribbon, so that it may be thrown back to the position illustrated in Fig. 5 of the drawings in order to maintain it out of the operative position and to give access to the type-well. A spring 147 is secured at one end, as illustrated at 148, to the bracket 145, and the free end of this spring is adapted to bear upon the edge 149 of the guide-plate when it is in the elevated position in order to maintain it in such position, and the spring is likewise effective to maintain the guide in the normal position (represented in Figs. 1 and 3) by bearing against the flat face 150 of said guide when the parts are in the normal position. A fixed bracket or abutment 151 is secured to the top plate 2 of the machine at 152, and the position of this bracket is such that it limits the downward movement of the guide and maintains it in proper position with relation to the platen. The guide-plate 142 has secured at 153 on the lower face thereof spring guide-fingers 154, which project forwardly and at each side of the central opening 143 in the plate and are adapted to maintain the ribbon properly positioned and to guide it between the plate and the fingers, so that the ribbon will not sag in its movement from spool to spool across the top plate of the machine.

Figure 26:
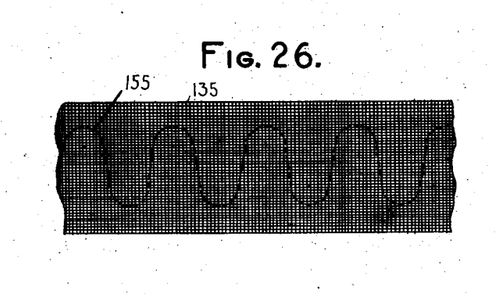
Fig. 26 is a diagrammatic plan view of a portion of the ribbon to illustrate the direction of feed thereof past the printing-point.

We have heretofore described the mechanism whereby motion is transmitted from the main driving-gear 40 of the ribbon-feed mechanism to impart a step-by-step lateral feed to the ribbon-frames 84 to move the ribbon in the direction of its width. We have likewise described the mechanism by which motion is transmitted from the main driving-gear to the eccentric 67 and from the eccentric to the segmental racks 88, whereby the rack-carriers 91 are moved up and down, so as to transmit a rotary movement to the gear-wheels 104, 105, 106, and 107 and through the coöperating clutch mechanism to the ribbon-spool shafts to rotate the ribbon-spools, and thereby impart a compound movement to the ribbon—that is to say, while the ribbon-spools are being moved back and forth upon their supports a rotary movement will be transmitted thereto, so that the ribbon is intermittently fed past the printing-point on a line corresponding substantially to the line 155 in the diagrammatic view shown in Fig. 26 of the drawings—in order to utilize the entire width as well as the entire length of the ribbon and to present a new point on the ribbon at the printing-point after each operation of a key-lever.

In accordance with our present invention we have provided means, in addition to the ribbon-feeding mechanism referred to, for automatically reversing the direction of longitudinal feed of the ribbon when an end thereof is reached, and we will now describe such reversing means in its coöperation with the structure to which reference has already been made.

Figure 11:
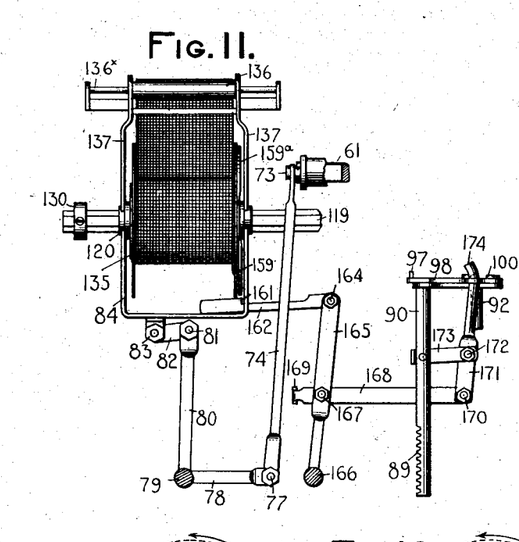
Fig. 11 is an isolated detail end view of a portion of the same.
Figure 12:
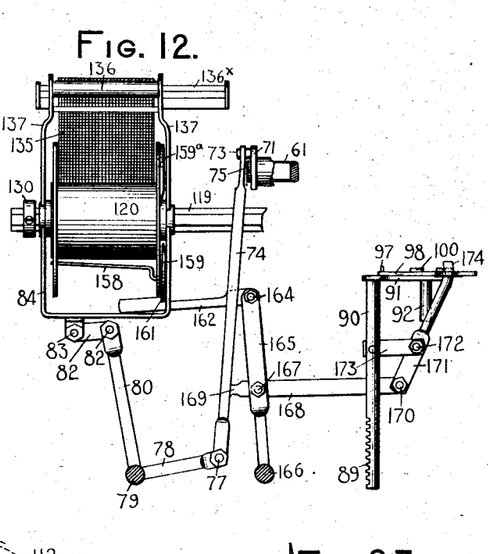
Fig. 12 is a view similar to that shown in Fig. 11, except that the parts are shown in different positions.
Figure 17:
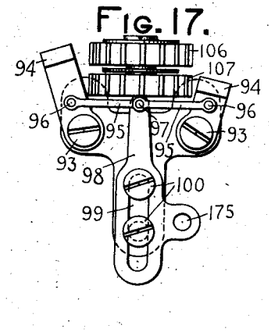
Fig. 17 is a like view of the same with the parts shown in the disengaged or inoperative position.
Figure 18:
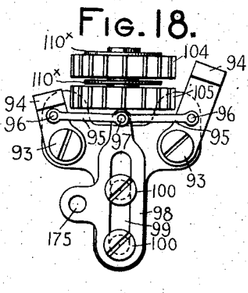
Fig. 18 is a detail plan view of a portion of the actuating mechanism for the other ribbon-spool, the parts being shown in the inoperative position.
Figure 19:
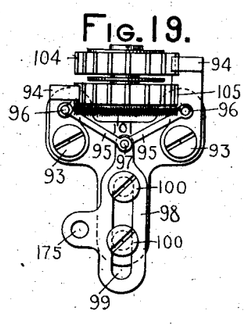
Fig. 19 is a like view of the same with the parts shown in the engaged or operative position.
Figure 22:
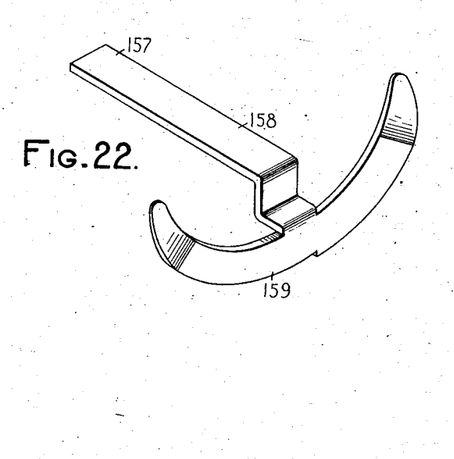
Fig. 22 is a detail perspective view of one of the operating-latches carried by the ribbon-spools.
Figure 23:
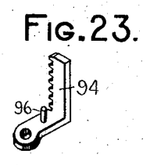
Fig. 23 is a detail perspective view of one of the actuating-racks for the ribbon-spools.
Figure 27:
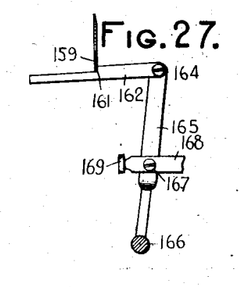
Fig. 27 is a detail side view of a portion of the ribbon-reversing mechanism to be hereinafter described.

Upon referring to Figs. 20, 21, and 22 of the drawings it will be seen that each of the ribbon-spools has one flange 126 thereof perforated at 156 for the reception of an end 157 of a latch 158, and the opposite end of this latch is provided with a segmental locking element 159, the outer edge of which extends outside of and conforms substantially to the contour of one flange of the ribbon-spool, it being seen that the body of the latch 158 extends from one flange to the other of the spool and projects through an elongated aperture 160 in one of the flanges, which permits a free movement of that end of the latch which carries the locking element 159, the swinging movement of the latch being around the end 157. The latch normally maintains the locking element 159 thereof in the elevated position represented in Fig. 20 of the drawings, by reason of the fact that the various layers of ribbon wound upon the spool will support the latch to prevent the locking element thereof from dropping. When, however, the ribbon is fully unwound from the spool, as represented in Fig. 12, the latch 158 will be permitted to drop by its own weight to a position where the locking element 159 will engage behind a shoulder 161, carried by a link 162, which projects through an opening 163 in the ribbon-frame. (See Fig. 15.) Should the position of the ribbon-frame be such in its relation to the link that the locking element will not immediately drop behind the shoulder 161, it will do so upon a further transverse movement of the ribbon-spool with its frame. During this transverse movement of the ribbon-spool and frame a slight rotary movement is at the same time imparted to the spool, as hereinbefore described; but this rotary movement is not sufficient to convey the locking element out of coöperative relation to the shoulder, for the reason that the segmental form of the locking element will permit a locking engagement to be effected at any point thereof during a one-third rotation of a ribbon-spool, as will be obvious from an examination of Fig. 21 of the drawings. It will be understood that each ribbon-spool is provided with one of these latches 158 and a coöperating link 162. The shoulder 161 on the link at one side of the machine is, however, somewhat differently disposed from that upon the link at the other side of the machine, as will be evident from a comparison of the link shown in Figs. 12 and 27 of the drawings. In other words, these shoulders are oppositely disposed, so that the coöperating locking element will in one case, Fig. 12, tend to pull the link forward with it, whereas the locking element of the other link, Fig. 27, will tend to push it rearwardly during the movement of the spools with their frames toward the rear of the machine, and the effect, therefore, of this construction is to move the links in opposite directions. It will be understood that a disengagement of the locking elements from their coöperating links is effected by a winding of the ribbon upon the spools or by a rotation of the spools themselves. Thus when a ribbon-spool has been rotated so as to move the latch thereof from the lowermost position on top of the spool the weight of the latch will cause it to be restored to the normal or unlocking position. A further rotation of the spool will wind the ribbon thereon, so that when the latch again reaches the lowermost position it is supported by the ribbon and cannot drop to the engaging position. Each spool may, if desired, have a segmented center weight 159$^a$ secured to a flange thereof to provide a well-balanced spool. Each of the links 162 is pivoted at 164 to an upwardly-extending crank-arm 165, which projects from a rock-shaft 166, to which both of said arms are connected, this rock-shaft 166 extending from side to side of the machine. Each of the arms 165 is pivoted at 167 to a link 168, that is provided at its free end with a finger-piece 169 for shifting the parts by hand. The rear end of each link 168 is pivoted at 170 to a reversing-lever 171, which lever is in turn pivoted at 172 to a bracket 173, rigidly secured to the vertically-movable rod 90 of a rack-carrier. The upper end 174 of the reversing arm or lever 171 projects through an opening 175 (see Figs. 16 to 19) of each slide 98, and the two reversing arms or levers 171 are moved simultaneously in the ame direction by reason of their connection with the rock-shaft 166. When, however, they are moved together, one of said reversing-levers causes the associated racks 94 to be moved around their pivots 93 and to be thrown out of engagement with their coöperating gears, whereas the other reversing-lever causes its racks 94 to be moved into engagement with their coöperating gears. This is due to the fact that the toggle-links 95, which are clearly shown in Figs. 16 to 19, are oppositely disposed. It follows, therefore, that a movement of the upper ends of the reversing-levers 171 toward the rear of the machine will cause the racks 94 which coöperate with the gears 106 and 107, that are on the left-hand side of the machine, to be thrown out of operation or out of mesh, as illustrated in Fig. 17. This same movement will cause the racks 94 which coöperate with the gears 104 and 105 on the right-hand side of the machine to be thrown into engagement, as illustrated in Fig. 19. The condition of affairs is reversed when the upper ends of the reversing-levers 171 are moved toward the front of the machine, as is clearly shown in Figs. 16 and 18 of the drawings, wherein the racks on the left-hand side of the machine are in engagement and those on the right-hand side of the machine are disengaged from their coöperating gears. It having been before explained that during the operation of the machine the carriers 91 for the feed-racks 94 are constantly moved up and down through the intermediate connections between the main driving-gear 40 and the racks 89, it will be understood that the ribbon-spool which has its actuating-racks 94 in engagement with the coöperating gears will be the spool which is rotated, while the other spool will be maintained out of operative engagement. The operatively-engaged ribbon-spool will continue to be rotated until the end of the ribbon has been reached upon the opposite spool, when the latch 158 of said opposite spool will automatically drop to the engaging position, where it will coöperate with a link 162, and the lateral movement imparted to the ribbon-spools and their frames 84 will be effective to shift both reversing-levers 171 to bring about an automatic reversal in the longitudinal feed of the ribbon. This shifting of the parts by one ribbon-spool is illustrated in Figs. 11 and 12, Fig. 11 illustrating the positions of the parts before the latch 158 has engaged the link 162. After engagement has taken place and a further lateral movement is transmitted to the ribbon-spools and their frames, as indicated in Fig. 12 of the drawings, the reversing-levers 171 will be moved from the position shown in Fig. 11 to that shown in Fig. 12, and a corresponding engagement of the racks of one spool will be effected and a simultaneous disengagement of the racks 94 of the other spool will be brought about. Should the operator desire to reverse the direction of feed by hand, it is merely necessary to move the parts by the hand-operated finger-piece 169, when the racks on one side of the machine will be disengaged from their coöperating gear-wheels, and the racks on the other side of the machine will be engaged with their coöperating gear-wheels, so as to reverse the direction of longitudinal feed of the ribbon in substantially the same manner that a reversal is effected by the automatic operation of the parts.

While we have shown and described with considerable detail one form or embodiment of our invention, it should be understood that various changes in the construction and operation of the device may be made without departing from the spirit of our invention and that certain features of the invention may be employed without the others.

Having described our invention, what we claim as new, and desire to secure by Letters Patent, is—

1. In a type-writing machine, the combination of a carriage, ribbon-spools, a plurality of gears operatively connected to each of said ribbon-spools, oppositely-operating friction-clutches, one controlled by each gear and each clutch being adapted to transmit motion from its gear to a ribbon-spool when said gear is moved in one direction and means for automatically moving the gears for one ribbon-spool at each feed movement of the carriage.

2. In a typewriting machine, the combination of a carriage, ribbon-spools, a plurality of gears for each ribbon-spool, a friction-clutch interposed between each gear and its ribbon-spool, the clutches for each spool being operable in the same direction, and means for automatically moving the gears for one spool in opposite directions at each feed movement of the carriage.

3. In a type-writing machine, the combination of a carriage, ribbon-spools, a plurality of gears for each ribbon-spool, a friction-clutch interposed between each gear and its ribbon-spool, the clutches for each spool being operable in the same direction, means for automatically moving the gears for one spool in opposite directions at each feed movement of the carriage, and means for permitting said gears to be maintained against movement when the carriage is moved in an opposite direction.

4. In a type-writing machine, the combination of a carriage, ribbon-spools, a plurality of gears for each ribbon-spool, a friction-clutch interposed between each gear and its spool, the clutches for each spool being operable in the same direction, means for automatically moving the gears for one spool in opposite directions at each feed movement of the carriage, and mechanism for rendering the moving means ineffective to transmit movement to one set of gears when it is effective to move the other.

5. In a type-writing machine, the combination of a carriage, ribbon-spools, a plurality of gears for each ribbon-spool, a friction-clutch interposed between each gear and its spool, the clutches for each spool being operable in the same direction, means for automatically moving the gears for one ribbon-spool in opposite directions at each feed movement of the carriage, and means for throwing said gears out of operative connection with their moving means.

6. In a type-writing machine, the combination of a carriage, ribbon-spools, a plurality of gears for each ribbon-spool, a friction-clutch interposed between each gear and its spool, the clutch for each ribbon-spool being operable in the same direction, means for automatically moving the gears for one ribbon-spool in opposite directions at each feed movement of the carriage, mechanism for rendering the moving means ineffective to transmit movement to one set of gears when it is effective to move the other set of gears, and means for throwing said gears out of operative connection with their moving means.

7. In a type-writing machine, the combination of a carriage, ribbon-spools, a plurality of gears for each ribbon-spool, a friction-clutch interposed between each gear and its spool, the clutches for each spool being operable in the same direction, means for automatically moving the gears for one ribbon-spool in opposite directions at each feed movement of the carriage, and automatically-operated mechanism for changing the effective engagement between the gears and their operating means when an end of the ribbon is reached, whereby the direction of feed of the ribbon is automatically reversed.

8. In a type-writing machine, the combination of a carriage, ribbon-spools, a plurality of gears for each ribbon-spool, a friction-clutch interposed between each gear and its spool, the clutches for each spool being operable in the same direction, means for automatically moving the gears for one spool in opposite directions at each feed movement of the carriage, mechanism for changing the effective engagement between the gears and their operating means, whereby the longitudinal direction of feed of the ribbon is reversed, and means for automatically moving the ribbon in a widthwise direction.

9. In a type-writing machine, the combination of a carriage, ribbon-spools, a plurality of gears for each spool, a friction-clutch interposed between each gear and its spool, the clutches for each spool being operable in the same direction, means for automatically moving the gears for one spool in opposite directions at each feed movement of the carriage, automatically-operated mechanism for changing the effective engagement between the gears and their operating means when an end of the ribbon is reached, whereby the longitudinal direction of feed of the ribbon is automatically reversed, and means for automatically moving the ribbon in a widthwise direction.

10. In a type-writing machine, the combination of ribbon-spools, a carriage, a revolving spring-drum operatively connected to said carriage, a driving-gear, a friction-clutch between the drum and driving-gear so that the driving-gear will move with the drum when the carriage is moved in the direction of its feed and will remain fixed against movement when the carriage is moved in an opposite direction, a driven gear meshing with said driving-gear, means controlled by the driven gear for imparting a rotary and transverse movement to the ribbon-spools, and hand-operated means for moving the driven and driving gears out of mesh one with the other.

11. In a type-writing machine, the combination of ribbon-spool, two gears for said ribbon-spool, which gears are intermittently rotated in opposite directions, a clutch between each of said gears and the ribbon-spool, said clutches being operable in the same direction so that the gear-wheels are adapted to alternately rotate the ribbon-spool in one direction, racks which mesh with gears, and means for automatically moving said racks.

12. In a type-writing machine, the combination of a carriage, a ribbon-spool, two gears for said ribbon-spool, a wedge and roller clutch between each of said gears and the ribbon-spool, said clutches being operable in the same direction so that the gear-wheels are adapted to rotate the ribbon-spool in one direction, racks which mesh with said gears, and means for automatically reciprocating said racks at each feed movement of the carriage.

13. In a type-writing machine, the combination of a carriage, a ribbon-spool, two gears for said ribbon-spool, a wedge and roller-clutch between each of said gears and the ribbon-spool, said clutches being operable in the same direction so that the gear-wheels are adapted to alternately rotate the spool in one direction, racks which mesh with said gears, means for automatically reciprocating said racks at each feed movement of the carriage, and means for throwing said racks out of mesh with their gears.

14. In a type-writing machine, the combination of ribbon-spools, two gears for each of said ribbon-spools, a wedge and roller-clutch between each of said gears and a ribbon-spool, the clutches for the different spools being operable in opposite directions, so that the gear-wheels of one set are adapted to rotate their ribbon-spool in one direction and the other gears are adapted to rotate their spool in an opposite direction, racks which mesh with said gears, means for automatically moving said racks, and means for throwing the racks of one set of gears into mesh when the racks of the other set are thrown out of mesh.

15. In a type-writing machine, the combination of ribbon-spools, two gears for each of said ribbon-spools, a wedge or roller-clutch between each of said gears and a ribbon-spool, the clutches for the different spools being operable in opposite directions, whereas the clutches for each spool are operable in the same direction, so that the gear-wheels of each set are adapted to rotate their ribbon-spool in one direction and the other gears are adapted to rotate their spool in an opposite direction, while the gears of each set alternately rotate their ribbon-spool in the same direction, racks which mesh with said gears, means for automatically moving said racks, reversing means for throwing the racks of one set of gears into mesh with their gears when the racks of the other set are thrown out of mesh, and means for automatically operating the reversing means when an end of the ribbon is reached.

16. In a type-writing machine, the combination of a carriage, ribbon-spools, two gears for each of said ribbon-spools, a wedge and roller-clutch carried by each of said gears and adapted to lock its gear to rotate the coöperating ribbon-spool in one direction and to permit its gear to revolve independently of the spool in an opposite direction, the clutches for the different spools being operable in opposite directions, racks which mesh with said gears, means for automatically reciprocating said racks at each feed movement of the carriage and for permitting them to be maintained against movement when the carriage is moved in an opposite direction, means for automatically moving the ribbon-spools transversely, reversing means for throwing the racks for one set of gears into mesh with their gears when the racks of the other set are thrown out of mesh, a gravity-latch carried by each spool and which coöperates with the reversing mechanism, whereby when an end of the ribbon is reached a latch will drop to connect the corresponding laterally-movable spool to the reversing mechanism and the reversing mechanism will be thrown to change the direction of longitudinal feed of the ribbon.

17. In a type-writing machine, the combination of a carriage, ribbon-spools, two gears for each of said ribbon-spools, a wedge and roller-clutch carried by each of said gears and adapted to lock its gear to rotate the coöperating ribbon-spool in one direction and to permit its gear to revolve independently of the spool in an opposite direction, the clutches for the different spools being operable in opposite directions, racks which mesh with said gears, means for automatically and intermittently reciprocating said racks at each letter-space-feed movement of the carriage and for permitting them to be maintained against movement when the carriage is moved in an opposite direction, means operatively connected to the carriage for automatically moving the ribbon-spools transversely, reversing means for throwing the racks for one set of gears into mesh with their gears when the racks of the other set are thrown out of mesh, hand-operated means for moving said reversing mechanism, a gravity-latch carried by each spool and which coöperates with the reversing mechanism, whereby when an end of the ribbon is reached, a latch will drop to automatically connect the corresponding laterally-movable spool to the reversing mechanism and the reversing mechanism will be thrown to change the direction of longitudinal feed of the ribbon.

18. In a type-writing machine, the combination of a rotatable and transversely-movable ribbon-spool, a rotatable unslotted supporting-shaft therefor, which shaft is angular in cross-section so as to present flat bearing-faces so that the shaft and spool will turn together, elongated bearing-roller ways within the hub of said spool, loosely-disposed bearing-rollers interposed between the shaft and spool and traveling in the ways of said spool, means for rotating said shaft, and means for moving the spool transversely or along said shaft.

19. In a type-writing machine, the combination of a rotatable and transversely-movable ribbon-spool, a rotatable unslotted supporting-shaft therefor which shaft is angular in cross-section and presents flat bearing-faces so that the shaft and spool will turn together, bearing-rollers for supporting said shaft and upon which the shaft turns, elongated bearing-roller ways within the hub of said spool, loosely-disposed bearing-rollers interposed between the shaft and spool and traveling in the ways of said spool, the said ways preventing a circular displacement of the rollers during the rotation of the spool, means for rotating said shaft, and means for moving the spool transversely or along said shaft.

20. In a type-writing machine, the combination of a rotatable and transversely-movable ribbon-spool, a supporting-shaft therefor, elongated bearing-roller ways within the hub of said spool, said ways comprising axially-arranged rods which are spaced apart to form roller-receiving spaces between them, loosely-disposed bearing-rollers interposed between the shaft and spool and traveling in the ways of said spool, and means for limiting the endwise movement of the rollers in their ways.

21. In a type-writing machine, the combination of a rotatable and transversely-movable ribbon-spool, a rotatable supporting-shaft therefor which shaft is angular in cross section so that the shaft and spool will turn together, bearing-rollers for supporting said shaft and upon which the shaft turns, elongated bearing-roller ways within the hub of said spool, said ways comprising axially-arranged rods which are spaced apart to form roller-receiving spaces between them, loosely-disposed bearing-rollers interposed between the shaft and spool and traveling in the ways of said spool, and means for limiting the endwise movement of the rollers in their ways.

22. In a type-writing machine, the combination of a rotatable and transversely-movable ribbon-spool, a supporting-shaft therefor, elongated bearing-roller ways within the hub of said spool, said ways comprising axially-arranged rods which are spaced apart to form roller-receiving spaces between them, loosely-disposed bearing-rollers interposed between the shaft and spool and traveling in the ways of said spool, means for limiting the endwise movement of the rollers in their ways, and a hand-operated finger-piece operatively connected to said shaft and by means of which the shaft may be turned.

23. In a type-writing machine, the combination of a ribbon-spool, a shaft therefor, two rotatable recessed gear-wheels which are alternately rotated in opposite directions for transmitting movement to said shaft, a cylindrical bearing part upon which said gear-wheels are adapted to rotate, the said cylindrical part being operatively connected to the ribbon-spool shaft, a spring-pressed clutch-roller contained in the recess of each wheel and adapted to be jammed between the shaft and a wall of the recess when its wheel rotates in one direction, so that the gear-wheel and shaft will rotate together and to be freed from the jamming position when the gear-wheel is rotated in an opposite direction so that the gear-wheel can rotate independently of the shaft, the said clutch-rollers being operable in the same direction, a rack in mesh with each of said gear-wheels, and means for automatically reciprocating said racks.

24. In a type-writing machine, the combination of two ribbon-spools, a shaft for each ribbon-spool, two coöperative rotatable recessed wheels for transmitting movement to each of said shafts, a cylindrical bearing part which coöperates with each associated pair of wheels, each of said cylindrical parts being operatively connected to one of said shafts, a clutch-roller contained in the recess of each wheel and adapted to be jammed between its shaft and wheel when the associated wheel is rotated in one direction, so that the wheel and shaft can rotate together and to be forced from the jamming position when the wheel is rotated in an opposite direction so that the wheel can rotate independently of the shaft, the clutch-rollers of each coöperating pair of wheels being operable in the same direction, means for rotating said wheels of each spool in opposite directions, and controlling means for rendering the rotating means for one coöperating set of wheels inoperative when the rotating means for the other set are operative.

25. In a type-writing machine, the combination of two ribbon-spools, a shaft for each spool, two coöperating rotatable recessed wheels for transmitting movement to each of said shafts, a cylindrical bearing part which coöperates with each associated pair of wheels, each of said cylindrical parts being operatively connected to one of the shafts, a clutch-roller contained in the recess of each wheel and adapted to be jammed between its shaft and wheel when the wheel is rotated in one direction, so that the wheel and shaft can rotate together and can be forced from the jamming position when the wheel is rotated in an opposite direction, so that the wheel can rotate independently of the shaft, the clutch-rollers of each coöperating pair of wheels being operable in the same direction, means for rotating said wheels, controlling means for rendering the rotating means for one coöperating set of wheels inoperative when the rotating means for the other set are operative, and means for automatically operating said controlling means when an end of the ribbon is reached.

26. In a type-writing machine, the combination of two ribbon-spools, a shaft for each ribbon-spool, means for automatically moving said ribbon-spools transversely on their shafts, two coöperating rotatable recessed gear-wheels for transmitting movement to each of said shafts, a cylindrical bearing part which coöperates with each associated pair of gear-wheels, each of said cylindrical parts being operatively connected to one of said shafts, a spring-pressed clutch-roller contained in the recess of each gear-wheel and adapted to be jammed between its shaft and gear-wheel when the wheel is rotated in one direction, so that the gear-wheel and shaft can rotate together and can be forced from the jamming position when the gear-wheel is rotated in an opposite direction, so that the wheel can rotate independently of the shaft, the clutch-rollers of each coöperating pair of gear-wheels being operable in the same direction, racks for rotating said wheels in opposite directions, hand-operated controlling means for rendering the racks for one coöperating set of wheels inoperative when the racks for the other set are operative, and means for automatically operating said controlling means when an end of the ribbon is reached.

27. In a type-writing machine, the combination of a pair of ribbon-spools, a pair of gear-wheels for rotating said spools, a pivoted rack which meshes with each of said gear-wheels, and means for moving said racks around their pivots and into and out of mesh with the gear-wheels.

28. In a type-writing machine, the combination of a pair of ribbon-spools, a pair of gear-wheels for rotating each of said spools, a pivoted rack which meshes with each of said gear-wheels, and means for moving the racks for one spool into mesh with their gear-wheels when the racks for the other spool are moved out of mesh with their gear-wheels.

29. In a type-writing machine, the combination of a pair of ribbon-spools, a pair of oppositely-rotating gear-wheels for rotating each of said spools, a pivoted rack which meshes with each of said gear-wheels, and means which are automatically operated when an end of the ribbon is reached for moving the racks of one ribbon-spool out of mesh with their gears and for simultaneously moving the racks of the other ribbon-spool into mesh with their coöperating gear-wheels.

30. In a type-writing machine, the combination of ribbon-spools, a pair of gear-wheels for transmitting a rotary movement to each of said ribbon-spools, rack-carriers, means for intermittently reciprocating said carriers, a rack for each gear-wheel pivoted to a carrier, and means for moving said racks around their pivots and into and out of mesh with their gear-wheels.

31. In a type-writing machine, the combination of a carriage, ribbon-spools, a pair of gear-wheels for transmitting a rotary movement to each of said ribbon-spools, rack-carriers, means for intermittently reciprocating said carriers at each feed movement of the carriage, a rack for each gear-wheel pivoted to a carrier, a slide carried by each of said carriers, intermediate connections between each of said slides and its coöperating racks and means for moving said slides to effect a movement of the racks around their pivots and into and out of mesh with their gear-wheels, the racks of one spool being moved into mesh when the racks of the other spool are moved out of mesh.

32. In a type-writing machine, the combination of ribbon-spools, a shaft for each ribbon-spool, a pair of gear-wheels for transmitting a rotary movement to each of said shafts, rack-carriers, means for intermittently reciprocating said carriers, a rack for each gear-wheel pivoted to a carrier, and means for moving said racks around their pivots and into and out of mesh with their gear-wheels.

33. In a type-writing machine, the combination of a carriage, ribbon-spools, a shaft for each ribbon-spool, a pair of gear-wheels for transmitting a rotary movement to each of said shafts, rack-carriers, means for intermittently reciprocating said carriers at each feed movement of the carriage, a rack for each gear-wheel pivoted to a carrier, a slide carried by each of said carriers, intermediate connections between each of said slides and its coöperating racks, and means for automatically moving said slides to effect a movement of the racks around their pivots and into and out of mesh with their gear-wheels when an end of the ribbon is reached, the racks for one spool being moved into mesh when the racks for the other spool are moved out of mesh, whereby the longitudinal direction of feed of the ribbon will be automatically reversed.

34. In a type-writing machine, the combination of a carriage, a rotatable spring-drum operatively connected to said carriage, a driving-gear, the movement of which is controlled by said drum, a pair of ribbon-spools, a pair of movable rack-carriers which are operatively connected to and are moved by said driving-gear, a pair of racks carried by each rack-carrier, and means for transmitting motion from said racks to the ribbon-spools.

35. In a type-writing machine, the combination of a carriage, a rotatable spring-drum operatively connected to said carriage, a driving-gear, the movement of which is controlled by said drum, a pair of ribbon-spools, a pair of movable rack-carriers which are operatively connected to and are moved by said driving-gear, a pair of racks carried by each rack-carrier, means for transmitting motion from said racks to rotate the ribbon-spools, means for moving one pair of racks into operation when the other pair of racks are moved out of operation, and means controlled by the driving-gear for moving said ribbon in a transverse direction.

36. In a type-writing machine, the combination of a carriage, a rotatable spring-drum operatively connected to said carriage, a driving-gear, the movement of which is controlled by said drum, a pair of ribbon-spools, a pair of movable rack-carriers which are operatively connected to and are moved by said driving-gear, a pair of racks carried by each rack-carrier, means for transmitting motion from said racks to rotate the ribbon-spools, means for automatically moving one pair of racks into operation and the other pair of racks out of operation when the end of the ribbon is reached and means controlled by the driving-gear for moving said ribbon-spools in a transverse direction.

37. In a type-writing machine, the combination of a carriage, a rotatable spring-drum operatively connected to said carriage, a driving-gear, the movement of which is controlled by said drum, a pair of ribbon-spools, a pair of movable rack-carriers which are operatively connected to and are moved by said driving-gear, a pair of racks carried by each rack-carrier, means for transmitting motion from said racks to rotate the ribbon-spools, means for automatically moving one pair of racks into operation and the other pair of racks out of operation when an end of the ribbon is reached, means controlled by the driving-gear for moving said ribbon-spools in a transverse direction, and hand-operated means for throwing all of said racks out of operation.

38. In a type-writing machine, the combination of a carriage, a rotatable spring-drum operatively connected to said carriage, a driving-gear, the movement of which is controlled by said drum, a pair of ribbon-spools, a pair of movable rack-carriers which are operatively connected to and are moved by said driving-gear, a pair of racks carried by each rack-carrier, means for transmitting motion from said racks to rotate the ribbon-spools, means for automatically moving one pair of racks into operation and the other pair of racks out of operation when an end of the ribbon is reached, means controlled by the driving-gear for moving said ribbon-spools in a transverse direction, and hand-operated means for moving said driving-gear out of coöperation with its coöperating mechanism, so that the ribbon-feed mechanism is rendered inoperative.

39. In a type-writing machine, the combination with the framing of the machine and its top plate, of a ribbon-spool at each side of said frame, and separate protecting-plates which are hinged to the top plate one at each side of the type-well and cover the ribbon as it passes over the top plate.

40. In a type-writing-machine, the combination with the framing of the machine and its top plate, of a ribbon-spool at each side of said frame, and protecting-plates which are hinged to the top plate and cover the ribbon as it passes over the top plate, the hinges of said protecting-plates being parallel to an edge of the ribbon.

41. In a type-writing machine, the combination with the framing of the machine and its top plate, of a ribbon-spool at each side of said frame, and backwardly-swinging protecting-plates which are hinged at the rear portions thereof to the top plate, one on each side of the type-well and which cover the ribbon as it passes over the top plate, the hinges of said protecting-plates being parallel to an edge of the ribbon.

42. In a type-writing machine, the combination with the framing of the machine and its top plate, of a ribbon-spool at each side of said frame, the ribbon passing over a side edge of the top plate in its movement from one spool to another, hinged protecting-plates which may be moved on the hinges independently of the ribbon.

43. In a type-writing machine, the combination with the framing of the machine and its top plate, of a ribbon-spool at each side of said frame, the ribbon passing over the side edges of the top plate in its movement from one spool to another, hinged protecting-plates which may be moved on the hinges independently of the ribbon, and a downwardly-protecting guard on one end of each protecting-plate which covers and protects the ribbon where it passes over a side edge of the top plate.

44. In a type-writing machine, the combination with the framing of the machine and its top plate, of a ribbon-spool at each side of said frame, the ribbon passing over the side edges of the top plate in its movement from one spool to another, hinged backwardly-swinging protecting-plates on the top plate and to each side of the type-well which protecting-plates may be moved on their hinges independently of the ribbon and a downwardly-projecting guard on one end of each protecting-plate which covers and protects the ribbon where it passes over a side edge of the top plate.

Signed at the borough of Manhattan, in the city of New York, in the county of New York and State of New York.

WALTER J. BARRON.
HENRY W. MERRITT.

Witnesses:
K. V. DONOVAN,
E. M. WELLS.